No. 824,617. PATENTED JUNE 26, 1906.
E. C. BERNHEIM.
EYEGLASSES.
APPLICATION FILED FEB. 18, 1904. RENEWED MAR. 8, 1906.

Witnesses
Chas. K. Davies.
M. E. Moore.

Eugene C Bernheim.
Inventor
by
Attorney

UNITED STATES PATENT OFFICE.

EUGENE C. BERNHEIM, OF NEWARK, NEW JERSEY.

EYEGLASSES.

No. 824,617.　　　Specification of Letters Patent.　　　Patented June 26, 1906.

Application filed February 18, 1904. Renewed March 8, 1906. Serial No. 304,901.

*To all whom it may concern:*

Be it known that I, EUGENE C. BERNHEIM, a citizen of the United States, residing at Newark, in the county of Essex and State of New Jersey, have invented certain new and useful Improvements in Eyeglasses, of which the following is a specification.

My invention relates to improvements in eyeglasses; and one object of my invention is the provision of an eyeglass which will adapt itself or perfectly fit the nose of the wearer and which will at all times retain the lenses in the proper position or parallelism with reference to the eyes.

Another object of my invention is the provision of an eyeglass which cannot possibly become detached and in which rattling or loosening of the parts is entirely prevented.

Another object of my invention is the provision of an eyeglass which will be of simple, inexpensive, and durable construction and which will be thoroughly efficient and practical in every particular.

With these objects in view my invention consists of an eyeglass embodying novel features of construction and combinations of parts, substantially as disclosed herein.

In order that the details of construction and the operation of the parts of my device may be fully understood and its many advantages be appreciated, I invite attention to the accompanying drawings, which illustrate an eyeglass constructed in accordance with and embodying my invention.

Figure 1:
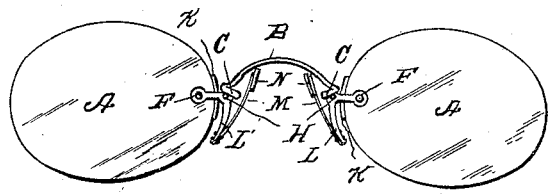
Figure 2:
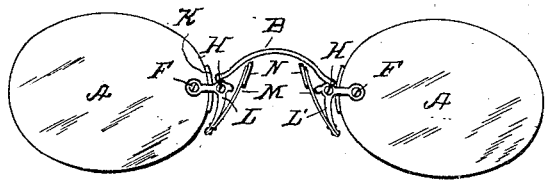
Figure 3:
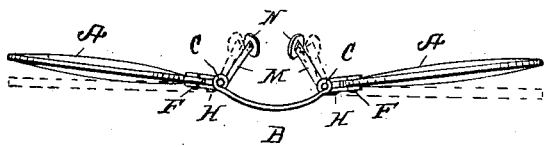
Figure 4:
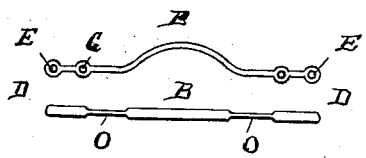
Figure 5:
Figure 6:
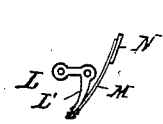
Figure 7:
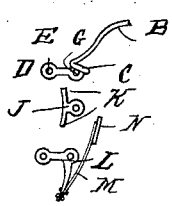
Figure 8:
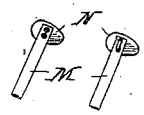

Figure 1 represents a rear elevation of the eyeglasses. Fig. 2 represents a front elevation. Fig. 3 represents a top plan or top edge view of the eyeglasses, dotted lines showing the position of the glasses when applied to the nose of the wearer. Fig. 4 is a detail view of the bridge or bow spring of my device to particularly illustrate its peculiar and novel construction, the views showing said spring before the coils or loops have been formed therein. Fig. 5 represents a detail view of the bridge or bow spring with the coils or loops formed therein. Fig. 6 represents a detail view of one of the nose-guards. Fig. 7 represents a detail view of one of the nose-guards, the intermediate bearing-plate, and one end of the bow or bridge spring; and Fig. 8 represents a detail view of the disks or pads carried by the nose-guards and which bear upon the nose.

In the drawings the letter A designates the lenses.

B designates the nose bridge or bow spring, formed with the coils C C and terminating in the horizontally-disposed ends D, having an opening E to receive the fastening F for attaching the plates or ends to the lens and also provided with the opening G to receive the screw H, which connects the intermediate plate J, having the lips K, which rest against the edge of the lens, and the fastenings F and H also serve to connect the nose-guards L to the lens and to the bridge-spring and the intermediate plate. The nose-guards have their depending portion L' tapered toward their lower end, to which lower end is connected the flat springs M, to which at the upper end are connected the nose pads or disks N. Said nose-pads may be loosely connected to the upper ends of said springs or may be rigidly secured, and an important feature of these pads is their peculiar elliptical shape or egg shape, as this construction insures the pads gripping the nose more firmly and preventing the eyeglasses from detachment or from becoming disarranged.

It will be observed that the flat bow or bridge spring is arranged at an incline or obliquely with reference to the lenses, this causing the glasses to fit the nose more perfectly and also to give a better appearance, and the spring, as shown in Fig. 4, is formed with the reduced or thin portions O, from which the coils and loops are formed, and the particular advantage of this construction is that the main or central portion of the spring remains comparatively rigid, but the coils or loops can be easily sprung to suit the circumstances and to insure a greater amount of resiliency at the coils and a perfect fitting of the lenses upon the nose. The coils of said spring are to be formed substantially as follows: Beginning at the innermost end of either stud the thin portions are to be bent first rearwardly, then lengthwise on a plane with the lenses, then outwardly, then upwardly and over the first bend in the coil, then lengthwise on a plane with the lenses and forming a complete loop or coil either of oval or circular shape, and being partially obscured from sight when looked at from the front, and this construction is an important feature, as it adds to the attractive appearance of the mounting. It will also be observed that the intermediate bearing-plates J are formed so as to present their thin edges to the edges of the lenses and are stamped out of stiffened metal. In the constructions now common in use the studs are formed of three pieces of metal brazed together, causing the metal to become soft and easily bent, and the lips or flanges of said studs present their broad sides to the edge of the lenses and being of soft material consequently are easily bent by the leverage exerted by the lenses in adjusting the glasses to the nose, thus losing the perfect alinement of the lenses. My construction avoids these disadvantages and supplies a most desirable and necessary adaptation of the devices, and another important feature of these bearing-plates is that when the parts of the glasses are put together they are pivoted between the nose-guard and the ends of the spring and that the lips of said bearing-plates adjust themselves to the fit of the edges of the lenses and prevent chipping of the edges of the glasses when being inserted into the studs, and when the parts are secured together a perfect fitting of the plates against the edges of the lenses is insured, and this is a very important feature, as in connection with the other features or parts of my eyeglass rattling of the parts is absolutely prevented. It will also be observed that the depending portions of the nose-guard are tapered toward their lower ends, which gives the strongest portion of said ends at the upper portion or juncture with the horizontal attaching portion of the nose-guard, and this is also an important feature, as it makes the guards strongest at the point of great strain. It will also be observed that the peculiar egg shape of the disks or pads carried by the nose-guard springs enables the disks to be either secured rigidly or loosely and that the egg shape insures a perfect engagement of the disks with the cuticle of the nose and absolutely prevents displacement or movement of the lenses upon the nose.

Another feature of importance in my invention is that I dispense with the studs or boxes in general and common use and make the horizontal ends of the spring and the horizontal portions of the nose-guards in connection with the intermediate plates form studs or connections of the parts with the lenses, and by my construction the lenses are always retained in the proper parallel and vertical position, and it is absolutely impossible for the parts to work loose or become detached, and rattling is thus absolutely prevented.

The egg-shaped or oblong nose-pads are fastened at their innermost ends, or as near as practicable thereto, by means of one oval or oblong pivot or by two separate rivets in order to maintain the horizontal plane of said nose-pads, the nose-pads to be rigidly or loosely pivoted, so that any movement of the cuticle of the nose or jar or gust of wind will not dislodge the glasses from their position on the nose. A novel and important feature in the said disks is their oval or oblong shape and being fastened at their innermost ends. The advantage of this construction is that the outer or long ends will take a deeper hold or engagement on the cuticle of the nose, and should perspiration on the nose cause the glasses to slide forward the peculiar construction will cause the long end to exert its pressure at the outermost end of said disks or pads, causing the cuticle to rise in front of said long end and cause a firm engagement and prevent forward movement upon the nose or dislodgment therefrom.

I claim—

1. An eyeglass consisting of the lenses, the nose-guards having the horizontal portions arranged on one side of the lens, the bow or bridge spring having the horizontal portions arranged on the other side of the lens, the intermediate bearing-plates, means for connecting the nose-guards and bearing-plates and for securing the nose-guards and spring to the lenses, said bow or bridge spring being formed with coils or spring-loops of thinner material than the body of the spring.

2. An eyeglass consisting of the lenses, the bow or bridge spring arranged obliquely or at an incline to the lenses and having the coils or loops of thinner material than the body portion and terminating in the horizontal portions arranged in line with the horizontal ends, the nose-guards having the horizontal portion of the spring, the plates having the lips fitting against the edges of the lenses and located between the horizontal portions of the nose-guards and spring, and the fastenings for connecting the horizontal portions of the spring and nose-guards with the lens and the fastenings for connecting the intermediate plates with said horizontal portions of the spring and nose-guard.

3. An eyeglass consisting of the lenses, the bow or bridge spring having its main or central portion arranged at an incline to the lenses and provided with the spring coils or loops of thinner material than the main portion thereof and terminating in the horizontal ends for attachment with the lenses, the nose-guards having the horizontal portions attached to the other side of the lenses and having the depending tapered end, the springs connected to the guards and carrying the egg-shaped nose-pads, and the intermediate bearing-plates fitting against the lenses and having a portion connected with the horizontal portion of the nose-guards and spring.

In testimony whereof I affix my signature in presence of two witnesses.

EUGENE C. BERNHEIM.

Witnesses:
WM. N. MOORE,
MARY A. WILSON.